No. 851,512. PATENTED APR. 23, 1907.
W. K. GORDON.
SAW OPERATING MECHANISM.
APPLICATION FILED JAN. 4, 1907.
2 SHEETS—SHEET 1.
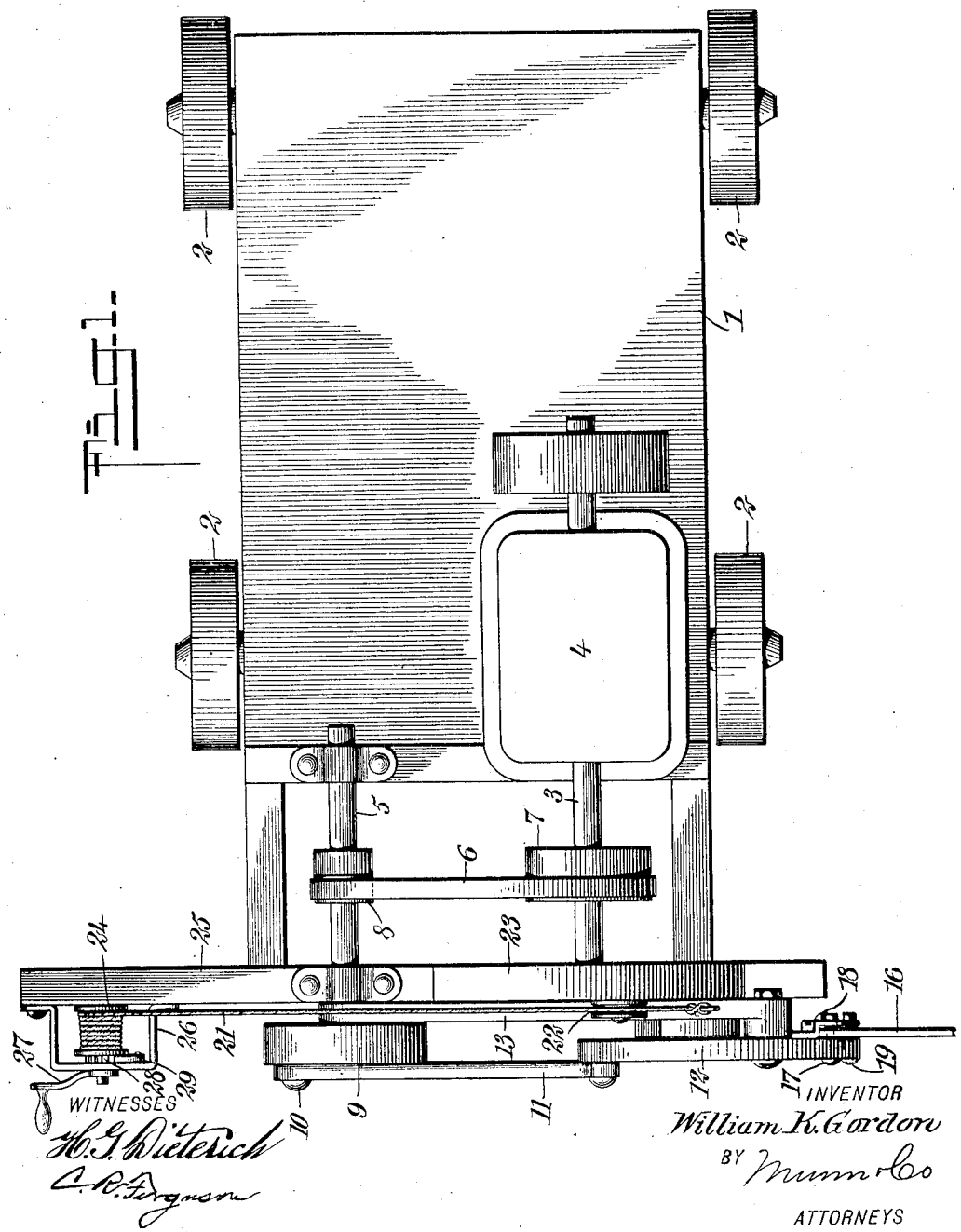
WITNESSES
INVENTOR
William K. Gordon
BY
ATTORNEYS No. 851,512. PATENTED APR. 23, 1907.
W. K. GORDON.
SAW OPERATING MECHANISM.
APPLICATION FILED JAN. 4, 1907.
2 SHEETS—SHEET 2.
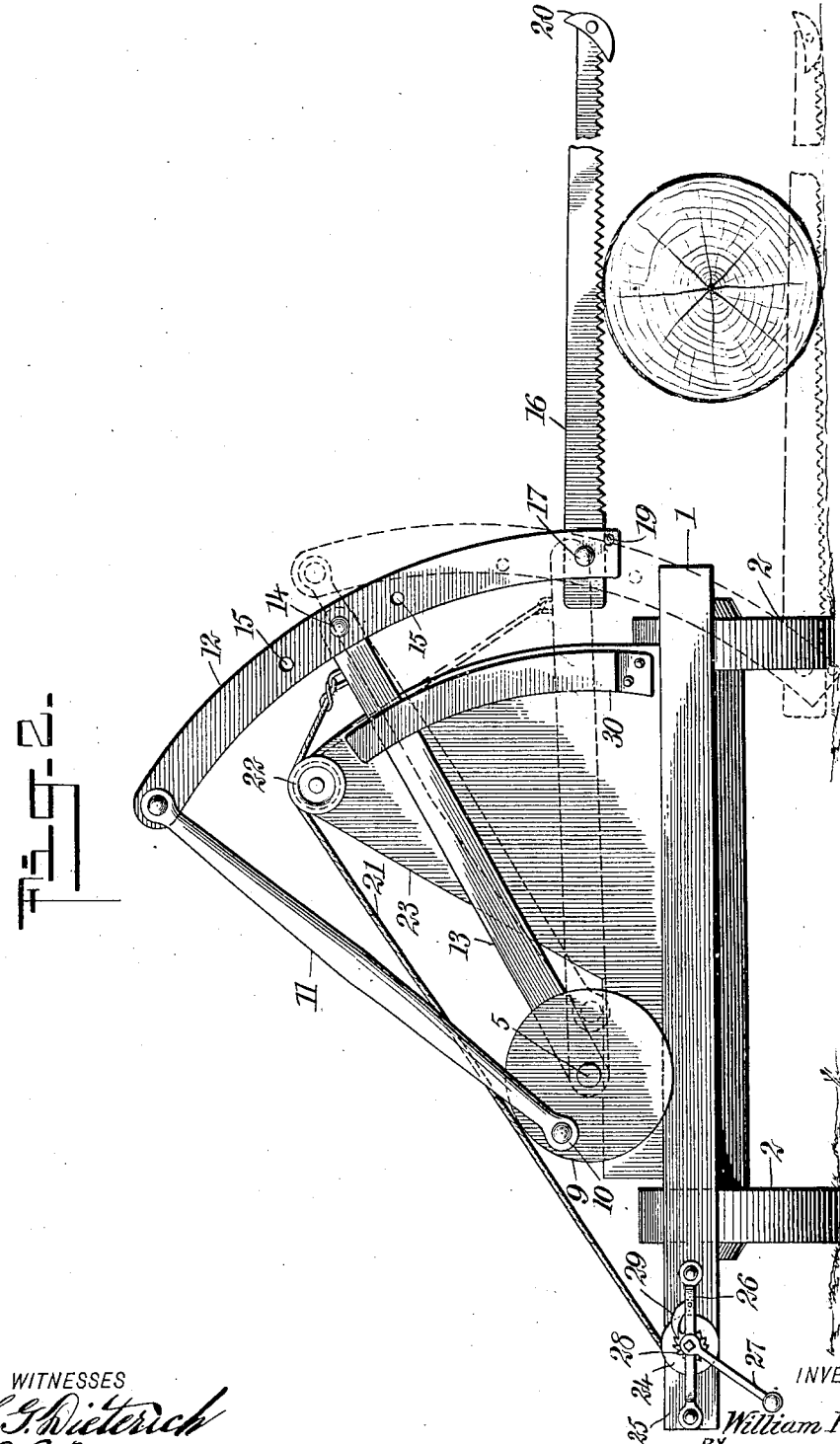
WITNESSES
INVENTOR
William K. Gordon
BY
ATTORNEYS

UNITED STATES PATENT OFFICE.

WILLIAM KNOX GORDON, OF THURBER, TEXAS.

SAW-OPERATING MECHANISM.

No. 851,512.  Specification of Letters Patent.  Patented April 23, 1907.

Application filed January 4, 1907. Serial No. 350,759.

*To all whom it may concern:*

Be it known that I, WILLIAM KNOX GORDON, a citizen of the United States, and a resident of Thurber, in the county of Erath and State of Texas, have invented a new and Improved Saw-Operating Mechanism, of which the following is a full, clear, and exact description.

This invention relates to improvements to mechanism for operating cross cut saws for cutting logs, timbers, trees or the like, into blocks or lengths while the wood to be operated upon is flat upon the ground, an object being to provide a saw mechanism of simple construction, that may be operated by any suitable motor.

Other objects of the invention will appear in the general description.

I will describe a saw operating mechanism embodying my invention and then point out the novel features in the appended claims.

Reference is to be had to the accompanying drawings, forming a part of this specification, in which similar characters of reference indicate corresponding parts in all the figures.

Figure 1 shows in plan a saw operating mechanism embodying my invention; and Fig. 2 is a side elevation thereof.

The device comprises a carriage having a platform 1 mounted on wheels 2, and these wheels turn at right angles to the length of the saw so that the carriage may be moved along a log or the like to bring the saw to a new place for cutting. Mounted on the carriage is a driving shaft 3 which may be operated by any suitable motor, such, for instance, as a gasoline motor or an electric motor, the motor being arranged in a casing 4 on the platform. The driving shaft 3 has driving connection with a crank shaft 5 and, as here shown, this driving connection consists of a band 6 engaging with a band pulley 7 on the driving shaft and with a driven pulley 8 on the crank shaft. On the outer end of the crank shaft is the crank consisting, as here shown, of a disk 9, from the crank pin 10 of which a pitman 11 extends to pivotal connection with the upper end of a segmental bar 12 which is pivotally mounted on an arm 13 mounted to swing on the shaft 5. The bar 12 and the arm 13 are adjustably pivoted together by means of a pivot pin 14 designed to pass through a perforation in the end of the arm 13 and through any one of the perforations 15 in said bar 12. By this adjustment the saw, to be hereinafter described, may be raised or lowered to accommodate it to small or large logs or timbers. A saw 16 is pivoted to the lower end of the bar 12 by means of a pin or bolt 17 which passes through said bar and also through a strap 18 attached to said bar, and adjacent to the bolt 17 and below the same, is another bolt 19 with which the lower edge of the butt of the saw is designed to engage, to prevent downward swinging movement of the saw when the saw is moved upward by an upward movement of the bar 12. The strap 18 and the bolt 19 limit the upward and downward swinging movement of the saw with respect to the bar 12. Pivotally connected to the outer end of the saw is a curved shoe 20 which is designed for two purposes; first, by engaging with the ground to prevent the engagement of the saw teeth with the ground when the saw shall have passed nearly through a log or the like, and the shoe also serves as a weight for causing the saw to move downward.

From the outer end of the arm 13 a rope or cable 21 extends over a pulley 22 mounted on an upright 23 supported on the machine platform. The rope or cable then passes outward to engagement with a winding-drum 24, the shaft of the drum at one end having a bearing in a timber 25 extended outward from the carriage, and the other end of the drum shaft has a bearing in a bracket 26, the said end of the shaft being projected entirely through the bracket and made angular to receive an operating hand crank 27. Mounted on the drum shaft adjacent to the bracket 26 is a ratchet wheel 28 designed to be engaged by a pawl 29 when it is desired to hold the saw in elevated position when moving the machine from place to place.

The operation is as follows: When the machine is placed to bring the saw in position for cutting through the log, the pawl 29 is to be moved out of engagement with the ratchet wheel, permitting the bar 12 to swing downward and engage the saw with the log, and, of course, the pawl is to remain released during the sawing operation. The driving shaft, by its connection with the crank shaft, which, by the way, need not be a band connection as shown, but a gear connection, causes the disk 9 to be turned and through the pitman 11 causes the swinging movement of the bar 12 to reciprocate the saw 16. After finishing a cut, the saw is to be raised out of the cut by engaging the pawl 29 with the ratchet wheel 28 and turning the drum by means of the crank handle 27.

It will be noted that the arm 13 is prevented from lateral movement, by engaging at one side with the upright 23 and at the other side with a curved strap 30 attached to said upright.

Having thus described my invention, I claim as new and desire to secure by Letters Patent:

1. A saw operating mechanism, comprising a platform, a driving shaft, a crank shaft having connection with the driving shaft, a crank on said crank shaft, an arm mounted to swing on the crank shaft, a segment bar having swinging connection with the outer end of said arm, a pitman connecting the crank to said bar, and a cross cut saw having pivotal connection with the lower end of said bar.

2. In a saw operating mechanism, a platform, a driving shaft supported on the platform, a crank shaft having operative connection with the driving shaft, an arm mounted to swing on the crank shaft, a curved bar having swinging connection with the outer end of said arm, a pitman extended from the crank to the upper end of said curved bar, a cross cut saw having swinging connection with the lower end of said curved bar, and means for swinging said curved bar upward to remove the saw from a cut.

3. A saw operating mechanism, comprising a wheel-mounted platform, a motor thereon, a driving shaft operated from the motor, a crank shaft, a driving connection between the two shafts, a crank on the outer end of the crank shaft, an arm having swinging connection with the crank shaft, a curved bar mounted to swing on the outer end of said arm, a pitman connection between the crank and the upper end of said bar, a saw having swinging connection with the lower end of the bar, a winding drum, a ratchet and pawl mechanism on said winding drum, rope or cable extended from said winding drum, means for raising the arm carrying the curved bar, and means for preventing the saw from moving downward relatively to the bar when the parts are swung upward.

4. In a saw mechanism, a swinging bar, means for causing the swinging movement thereof, a saw pivoted to the lower end of said bar, a pin extended through the bar below the pivotal connection and adapted to engage with the butt portion of the saw, and a shoe carried on the outer end of the saw and extending below the cutting edge thereof.

5. In a cross cut saw mechanism, a swinging bar, means for causing the swinging movement thereof, a cross cut saw in pivotal connection with said bar, and a curved shoe pivoted to the outer end of the saw.

6. In a saw mechanism, a wheel-mounted platform, a driving shaft carried on the platform, a crank shaft carried on the platform and having driving connection with the driving shaft, an arm mounted to swing on the crank shaft, a bar having swinging connection with said arm, a crank on the crank shaft, a pitman connection between the upper end of said bar and the crank, an upright on the platform, a pulley carried by the upright, a cable extended from said swinging arm over said pulley, a winding drum with which said cable engages, a plate attached to the upright for engaging the outer side of the arm, said plate being of segmental form, and a saw having swinging connection with the bar.

In testimony whereof I have signed my name to this specification in the presence of two subscribing witnesses.

WILLIAM KNOX GORDON.

Witnesses:
W. G. RHODES,
FAY KEASBY GORDON.